(No Model.)

W. W. STEWART.
PROCESS OF BUILDING PERFORATED IRIDIUM TIPS FOR STYLOGRAPHIC PENS, &c.

No. 246,570.   Patented Aug. 30, 1881.

Attest:
R. F. Barnes.
L. H. Marshall.

Inventor:
W. W. Stewart
By his Atty
R. D. O. Smith

UNITED STATES PATENT OFFICE.

WILLIAM W. STEWART, OF BROOKLYN, NEW YORK.

PROCESS OF BUILDING PERFORATED IRIDIUM TIPS FOR STYLOGRAPHIC PENS, &c.

SPECIFICATION forming part of Letters Patent No. 246,570, dated August 30, 1881.

Application filed September 11, 1880. (No model.)

*To all whom it may concern:*

Be it known that I, WILLIAM W. STEWART, of Brooklyn, Kings county, in the State of New York, have invented a new and useful Method or Process of Making Perforated Iridium Tips for Stylographic Pens, Watch-Makers' Use, and other like Purposes; and I do hereby declare that the following is a full and complete description of the same.

I am aware that it has been proposed to build up an iridium tip by arranging small fragments of iridium around a wire of copper, and then securing the same to each other by solder; but, so far as I am aware, it has never been proposed to employ other substances with the flux, such as borax. Therefore the important element of my invention is the employment of a cement to hold the fragments without impeding the flow of solder. A cementing substance capable of so holding the metallic grains while they are being soldered is gum-tragacanth.

That others may fully understand my invention, I will more particularly describe it, having reference to the accompanying drawings, wherein—

Figure 1:
Figure 2:
Figure 3:
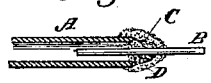
Figure 4:
Figure 5:

Figure 1 represents the non-corrodible tube and corrodible core. Fig. 2 represents the same with the coating of tragacanth and iridium-dust. Fig. 3 represents the same with overlying mixture of solder and flux. Fig. 4 represents the same after fusion. Fig. 5 represents the same completed.

My process is as follows: I first prepare a small tube, A, of gold, of proper size. This is conveniently made from hollow wire. I then prepare a piece of copper wire, B, having a diameter a trifle smaller than the diameter of the orifice in the proposed tip. This wire is inserted and held properly in the end of the tube A. I then cover the end of the tube A and a portion of the wire with gum-tragacanth dissolved in water, and sprinkle on the same as much iridium-dust as will adhere to the gum, as shown at C, and permit the latter to dry thoroughly. When the gum has become dry the iridium is painted over with a paste of borax ground with distilled water, and the paste is sprinkled with solder in fine filings or dust, as much as will adhere, as shown at D. The solder is preferably composed of gold, say, fourteen parts; silver, ten parts. The whole is submitted to the blow-pipe. The tragacanth assists in holding the fine granular mass together, while the borax fluxes, and upon fusion of the solder the gum, which is highly carbonaceous, floats upon the fused metallic mass and permits the solder to flow freely under it. Upon cooling, a slightly-globular mass, E, is found, uniting the tube A and wire B. The excess of copper wire is snipped off and the whole placed in a bath of nitric acid, which dissolves the copper and leaves the iridium tip with a central perforation capable of being finished by the broach and polishing-tool. The excess of metal is removed by grinding to reduce the tip to the proper exterior form, as shown at F.

This process renders it easy to make iridium tips, &c., perforated with irregular orifices, if such be required—such as holes with longitudinal channels in the sides, interior enlargements, screw-threads, &c.—because the hole will conform to the pre-existing exterior form of the copper core.

Having described my invention, what I claim as new is—

1. The process, substantially as herein described, of building perforated iridium tips for stylographic pens and like purposes, which consists, essentially, in cementing iridium-dust or small fragments of the same upon a core of copper or other corrodible metal with tragacanth, and afterward covering said iridium and tragacanth with a flux and solder, then fusing the solder, and subsequently removing the core by corrosion or otherwise.

2. The process of building perforated tips for stylographic pens and like purposes, which consists as follows: first, placing a wire of copper or other base material within a suitable tube of non-corrodible metal, and covering portions of each with dissolved tragacanth, and sprinkling with iridium-dust as much as will adhere; second, after thoroughly drying the tragacanth and iridium, covering with a paste of borax, ground in distilled water, and sprinkling with dust or filings of solder composed of gold—say fourteen parts—and silver—say ten parts—as much as will adhere; third, fusing the solder by the blow-pipe; fourth, dissolving the wire out by acid; fifth, finishing the tip by grinding and polishing, substantially as set forth.

WILLIAM W. STEWART.

Witnesses:
JOSEPH M. LAYAT,
HAROLD D. WATSON.